United States Patent
Utsumi et al.

(10) Patent No.: US 7,110,023 B2
(45) Date of Patent: Sep. 19, 2006

(54) METHOD AND APPARATUS FOR TARGET OBJECT EXTRACTION FROM AN IMAGE

(75) Inventors: Akira Utsumi, Kyoto (JP); Nobuji Tetsutani, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 902 days.

(21) Appl. No.: 10/050,966

(22) Filed: Jan. 22, 2002

(65) Prior Publication Data

US 2003/0107653 A1 Jun. 12, 2003

(30) Foreign Application Priority Data

Dec. 10, 2001 (JP) .............................. 2001-376000

(51) Int. Cl.
*H04N 5/228* (2006.01)
(52) U.S. Cl. .................. 348/208.14; 348/169; 382/103
(58) Field of Classification Search ........... 348/207.99, 348/208.14, 143, 152–155, 169; 382/103
See application file for complete search history.

(56) References Cited

U.S. PATENT DOCUMENTS

| | | | | |
|---|---|---|---|---|
| 4,908,704 A * | 3/1990 | Fujioka et al. | ............... | 348/155 |
| 6,141,433 A * | 10/2000 | Moed et al. | ................. | 348/143 |
| 6,185,314 B1* | 2/2001 | Crabtree et al. | ............. | 348/169 |
| 6,295,367 B1* | 9/2001 | Crabtree et al. | ............. | 382/103 |
| 6,542,621 B1* | 4/2003 | Brill et al. | ................... | 382/103 |
| 6,731,799 B1* | 5/2004 | Sun et al. | .................... | 348/155 |
| 6,760,465 B1* | 7/2004 | McVeigh et al. | ........... | 382/103 |

* cited by examiner

*Primary Examiner*—David Ometz
*Assistant Examiner*—Gevell Selby
(74) *Attorney, Agent, or Firm*—McDermott Will & Emery LLP (57) ABSTRACT

Geometrical structures of a human image and a background image picked up by a camera are extracted as difference in pixel value distributions, a statistical model of the appearance of the human image is first constructed to find a discrimination axis, the model is compared with an input image, a score is calculated based on the discrimination axis of the model and a distance value vector of the input image, and when the score exceeds a threshold value, it is determined that a human figure is detected. Thus, highly efficient recognition is possible using a small number of models.

10 Claims, 11 Drawing Sheets

METHOD AND APPARATUS FOR TARGET OBJECT EXTRACTION FROM AN IMAGE

BACKGROUND OF THE INVENTION

1. Field of the Invention

The present invention relates to a method and an apparatus for recognizing an object. More specifically, the present invention relates to an apparatus and a method for recognizing a target object image from images.

2. Description of the Background Art

Object recognition is one of the most essential tasks of computer vision. For instance, landmark detection is very important for robot navigation, and the stability of various tracking systems highly depends on the detection of targets. Recognition and tracking of human movement using images have been studied vigorously in these days, and stable object detection is essential in this field. In most of the conventionally proposed human tracking systems, however, the detecting process has been simplified by employing strong assumptions on the environment, so as to reduce cost of calculation. One of the most popular methods is moving area extraction based on background subtraction (interframe subtraction). However, for the background subtraction, both the camera position and the background must be fixed. Further, motions of objects other than the target of tracking cannot be allowed. This causes a serious problem when the system is expanded for use in more general situations.

Another method of recognition utilizes color information. For example, skin regions have nearly uniform colors, and therefore some have used color information to extract face and/or hand regions. However, color information is not robust against changes in the environment including illumination, and moreover, area detection can be difficult when the image size is small.

SUMMARY OF THE INVENTION

Therefore, an object of the present invention is to provide a method and apparatus for recognizing an object in which the target object is extracted not as moving areas or specific color regions but detected based on appearance characteristic of the object itself.

Briefly stated, the present invention provides an apparatus for recognizing a target object from images, in which pixel value distributions of various regions of background images existing as a background of a target image and various regions of the target image are extracted by pixel value distribution extracting means, and the target image is recognized by recognizing means based on difference in the extracted pixel value distributions between each of the regions.

Therefore, according to the present invention, an object image is recognized based on appearance characteristic of the object itself, that is, difference in the extracted pixel value distributions of various regions, and therefore correct recognition is possible even when the object has unspecified pixel values.

Further, the background image and the object image are divided into blocks, distances between pixel value distributions of different blocks are calculated, a distance map as a set of distances between blocks is found, an element extracted from each distance map is represented as a distribution of distance vector of a prescribed dimension, and a discrimination axis for discriminating distribution of the distance value vector in each of the background image and the object image is found.

Further, lower contribution elements are removed from the calculated discrimination axis, and the discrimination axis is calculated again to reduce the number of dimensions.

Further, the distance value vector is calculated for each portion of an input image, and when a value calculated based on the calculated distance value vector and the calculated discrimination axis is not lower than a prescribed threshold value, it is determined that the object image is detected.

Further, average vector and covariance matrix of pixel values are calculated for every possible block of the input image, and the distance value vector is calculated with the number of dimensions reduced.

Images of different resolutions are generated from the input image, and recognizing process is performed on the images of different resolutions.

According to another aspect, the present invention provides a method of recognizing a target object image from images, including the first step of extracting pixel value distributions corresponding to various regions of a background image existing as a background of the object image and various regions of the object image, and the second step of recognizing the target image based on the difference in the pixel value distributions of various regions extracted in the first step.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Prior to the description of the embodiments, the concept of the present invention will be discussed. For an object having various textures such as a human figure, it is impossible to employ assumption of specific pixel values of various portions of the object. Therefore, in the present invention, an object is recognized based not on the pixel values themselves but on the change in pixel value distributions. More specifically, in the present invention, characteristics common to the versatility of pixel values of the object such as difference in color/texture resulting from variation of clothes, for example, are extracted, and the object is recognized using these characteristics. If the color/brightness of a target object is stable, pixel values provide important information of the object. For some objects, however, we cannot expect particular pixel values. For example, a human figure consists of several parts such as a head, body, legs, arms and the like, but a variety of clothes can cover some of these parts. As there are innumerable variations of clothes, including length of the sleeves and the like, it is impossible to prepare in advance every possible color, pattern and the like as models.

Conversely, the geometrical locations of the body parts are similar to all human figures. The relative positions and shapes of the head, body and legs are common among human figures wearing different clothes. Therefore, in the present invention, geometrical structures of the target object are extracted as difference in pixel values to construct statistical model of the appearance of the target object, and the resulting statistical model is compared with an input model, a score is calculated, and when the score exceeds a threshold value, it is determined that a human figure is detected.

Figure 1:
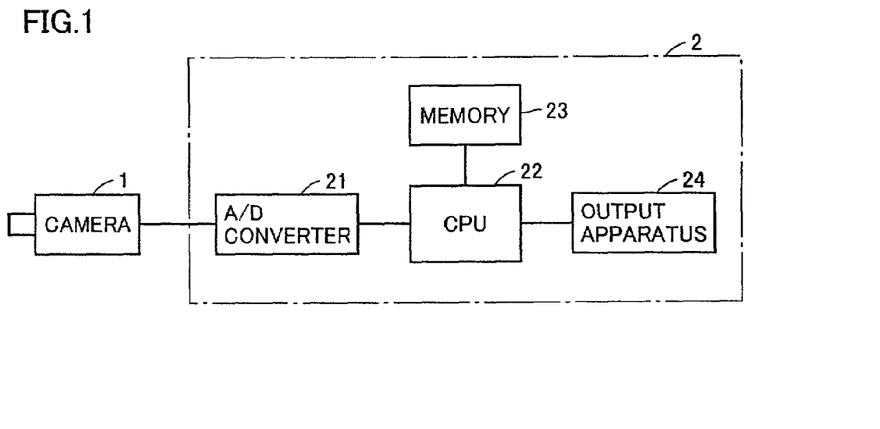
FIG. 1 is a block diagram of the object recognizing apparatus in accordance with an embodiment of the present invention.

FIG. 1 is a block diagram of the object recognizing apparatus in accordance with one embodiment of the present invention. Referring to FIG. 1, a camera 1 picks up background images and human images, and applies image signals thereof to a recognizing apparatus 2. Recognizing apparatus 2 includes an A/D converter 21, a CPU 22, a memory 23 and an output apparatus 24, and image signals from camera 1 are converted by A/D converter 21 to digital signals and applied to CPU 22. CPU 22 performs a program processing based on flow charts shown in FIGS. 2 and 11, which will be described later, stored in memory 23, and provides the result to output apparatus 24.

Figure 2:
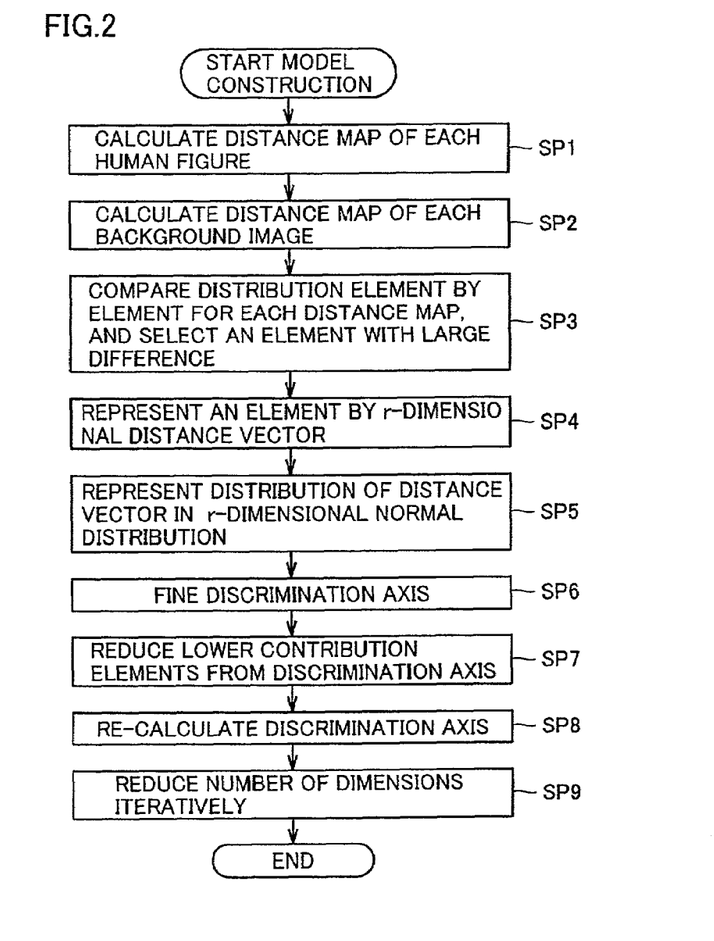
FIG. 2 is a flow chart representing the procedure of model construction in the object recognizing processing in accordance with an embodiment of the present invention.
Figure 3A:
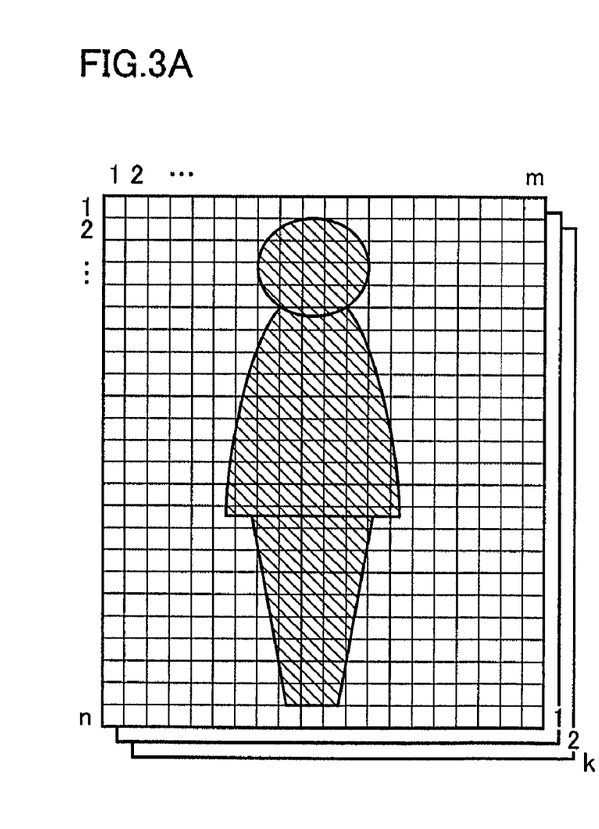
FIGS. 3A and 3B are illustrations representing block division for model construction.
Figure 3B:
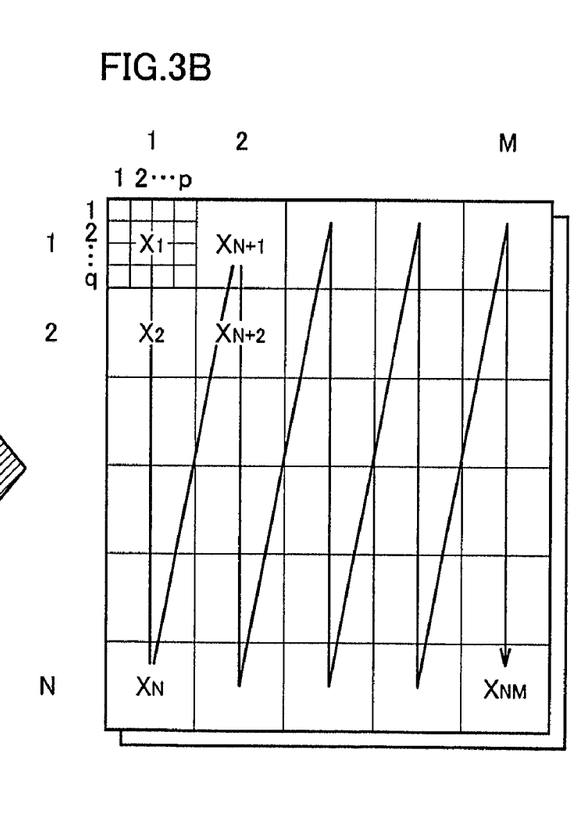
Figure 4:
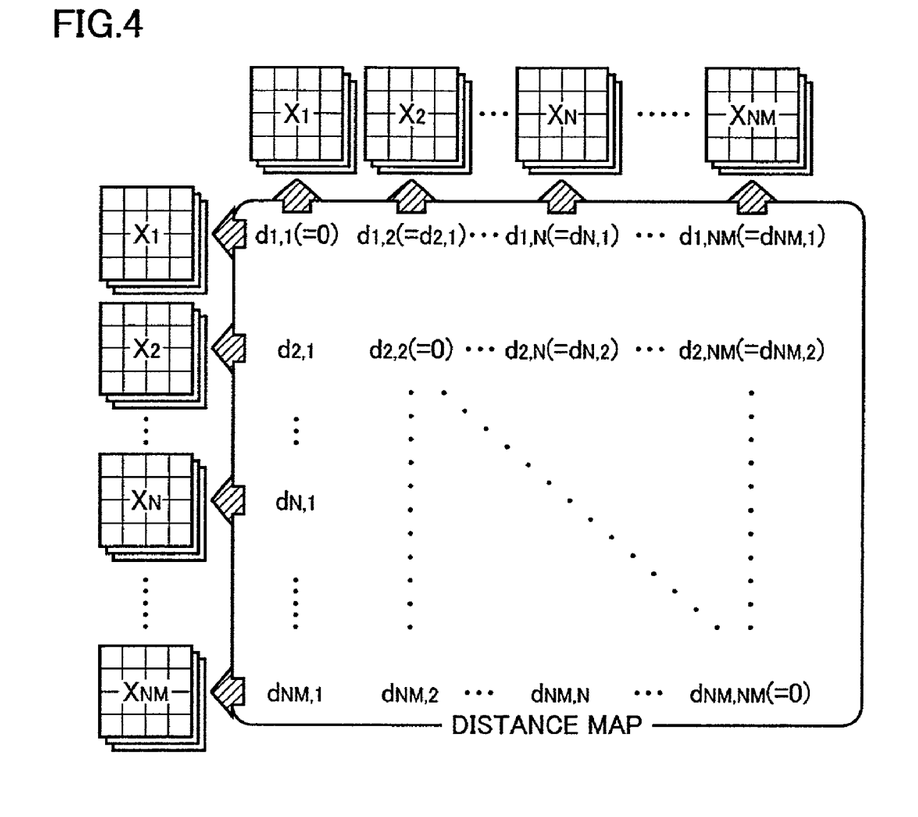
FIG. 4 is an illustration representing calculation of the distance map of the divided blocks.

FIG. 2 is a flow chart representing the procedure of model construction in the object recognizing process in accordance with one embodiment of the present invention. FIGS. 3A and 3B represent block division for model construction, and FIG. 4 is an illustration representing calculation of distance maps of divided blocks.

The operation of model construction in accordance with one embodiment of the present invention will be described with reference to FIGS. 1 to 4. A human image is picked up by camera 1 shown in FIG. 1, the image is converted by A/D converter 21 to digital signals and stored in memory 23. Thereafter, a background image is picked up by camera 1, converted to digital signals and stored in memory 23. In step (represented by SP in the figure) SP1, CPU22 calculates distance map of the human image, and in step SP2, calculates distance map of the background image.

Here, the human image is divided into several regions (blocks) as shown in FIG. 3A, distances between every two blocks are calculated, and the set of distances calculated for every blocks of FIG. 3B will be referred to as a "distance map".

Various calculations are possible for the distance map. In the present embodiment, Mahalanobis distance is adopted, in view of simplicity of calculation. More specifically, the image size of the input image is represented as m×n, as shown in FIG. 3A. Here, each pixel $x_{s,t}$ (1<s<m, 1<t<n) can be described as a k-dimensional vector, by the following equation (1).

$$x_{s,t} = [y1, y2 \ldots y_k]' \quad (1)$$

For instance, k=1 for gray scale images, as the image can be described by binary values, that is, white and black, while k=3 for color images, as the images are described by R, G and B.

Next, the input image is divided into small blocks, as shown in FIG. 3B. Each block is assumed to have p×q pixels and there are M blocks in the horizontal direction and N blocks in the vertical direction. In FIG. 3B, the blocks have unique numbers 1 ... MN, and the blocks will be referred to as $X_1 \ldots X_{MN}$.

Thereafter, an average vector $\bar{x}_1$ and covariance matrix $\Sigma_1$ of pixels in each block $X_1$ are calculated in accordance with equations (2) and (3).

$$\bar{x}_1 = \frac{1}{pq} \sum_{(s,t) \in X_1} x_{s,t} \quad (2)$$

$$\sum_1 = \frac{1}{pq} \sum_{(s,t) \in X_1} (x_{s,t} - \bar{x}_1)(x_{s,t} - \bar{x}_1)' \quad (3)$$

Finally, Mahalonobis distance between every two blocks are calculated and the distance map D is determined. Here, it holds $$d_{(i,j)} = (\bar{x}_i - \bar{x}_j)'(\Sigma_i + \Sigma_j)^{-1}(\bar{x}_i - \bar{x}_j) \quad (4)$$

FIG. 4 represents the divided blocks $X_1 \ldots X_{MN}$ of FIG. 3B as a distance map of a matrix of distances $d_{1,1}, d_{1,2}, \ldots, d_{NM, NM}$, which is symmetrical with respect to the diagonal (upper left to lower right).

Figure 5:
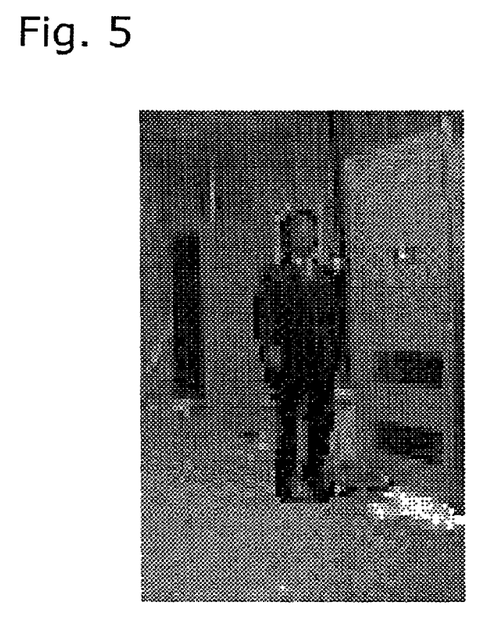
FIG. 5 shows an example of an input image.
Figure 6:
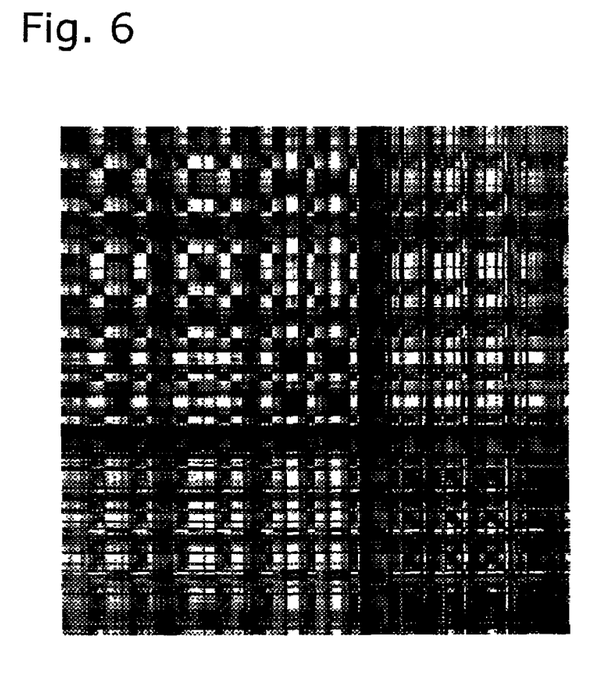
FIG. 6 shows an example of the distance map.

FIG. 5 shows an example of an actual input image, and FIG. 6 is an exemplary distance map for the input image of FIG. 5.

The input human image shown in FIG. 5 consists of 60×90 pixels, and when the input image is divided into blocks each of 5×5 pixels, a distance map having the size of 228×228 such as shown in FIG. 6 is obtained. In FIG. 6 again, the distance map is symmetrical with respect to the diagonal (upper left to lower right). In FIG. 6, it is likely that portions close to each other of the images picked up by the camera 1 possibly have similar colors or patterns, while portions distant from each other possibly have different colors or patterns, and hence portions with small distance appear dark, while the pattern becomes brighter as the distance increases.

When a human figure is included, there is a clear distinction between the background and the human figure at the boundary of the human figure, and therefore corresponding portions become bright. Further, within the human figure, it is likely that the clothes has the same color or same pattern, and therefore, the corresponding portion will possibly be dark. Thus, there appears a difference between the background distribution and the human distribution.

Figure 7:
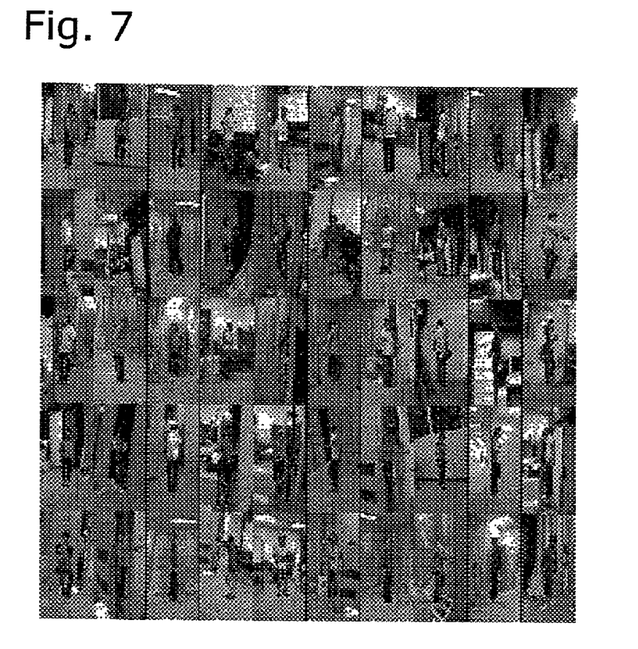
FIG. 7 shows an example of a distance map of a human image.

Based on the distance map described above, a model is constructed for discriminating the target object (human) image and the background image. FIG. 7 shows an example of the distance map of the human image shown in FIG. 5, and FIG. 8 shows an example of the distance map of the background image.

Figure 8:
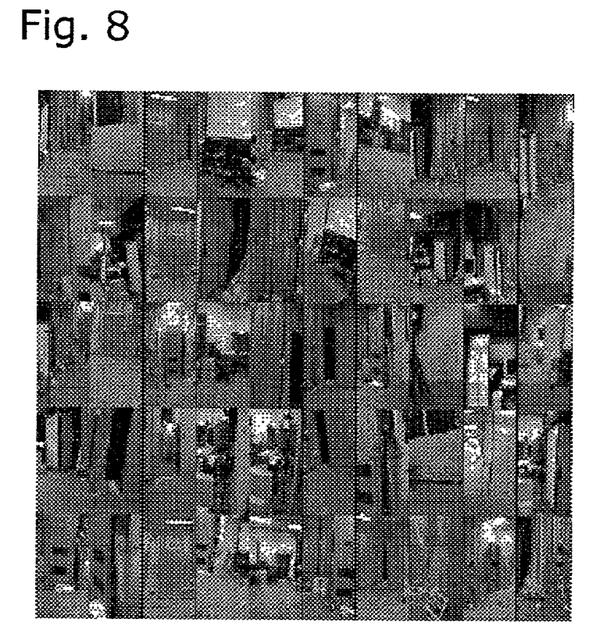
FIG. 8 shows an example of a distance map of a background image.

In the example shown in FIGS. 7 and 8, it is necessary that the human figures appear approximately at the same position in approximately the same size in respective images. Therefore, an image picked-up separately is combined as the human image, with the background image.

Next, average ($d_{obj\ (i,j)}$, $d_{bck\ (i,j)}$) and variance ($\sigma^2_{obj\ (i,j)}$, $\sigma^2_{bck\ (i,j)}$) for each element in the map are calculated in accordance with equations (5) to (8), for pixels of the object (obj) and the background (bck).

$$\bar{d}_{obj(i,j)} = \frac{1}{K}\sum_{k=1}^{K} d_{obj,k(i,j)} \quad (5)$$

$$\bar{d}_{bck(i,j)} = \frac{1}{K}\sum_{k=1}^{K} d_{bck,k(i,j)} \quad (6)$$

$$\sigma^2_{obj(i,j)} = \frac{1}{K}\sum_{k=1}^{K} (d_{obj,k(i,j)} - \bar{d}_{obj(i,j)})^2 \quad (7)$$

$$\sigma^2_{bck(i,j)} = \frac{1}{K}\sum_{k=1}^{K} (d_{bck,k(i,j)}p - \bar{d}_{bck(i,j)})^2 \quad (8)$$

Figure 9:
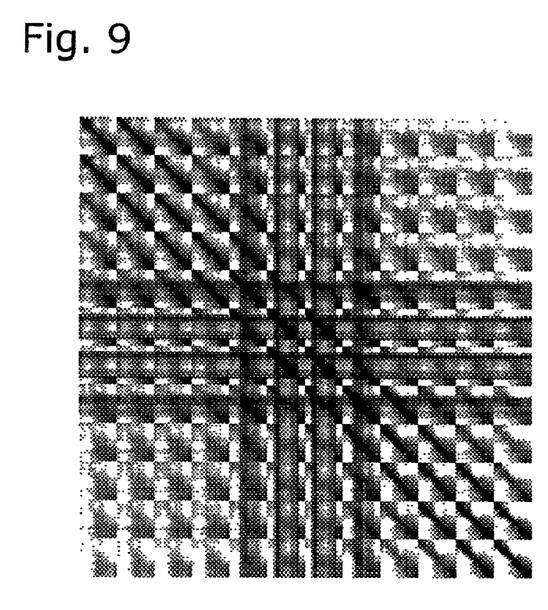
FIG. 9 shows an example of an average distance map of a human image.
Figure 10:
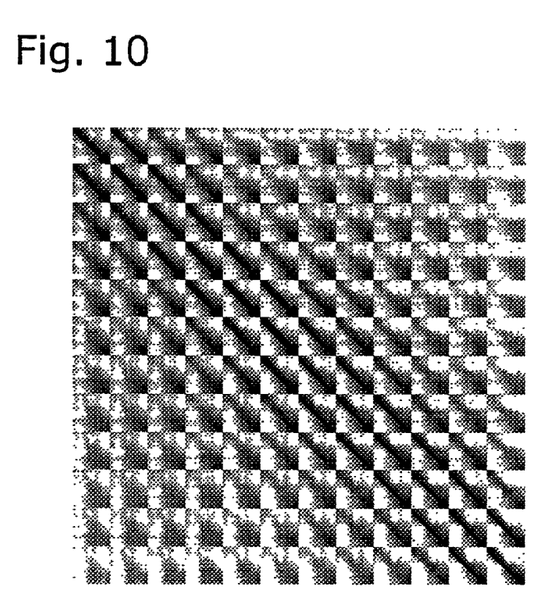
FIG. 10 shows an example of an average distance map of the background image.

FIG. 9 shows the calculated average of distance maps for human image and FIG. 10 shows an example of the calculated averages of distance maps for the background image.

As is apparent from FIG. 10, the distance values is small for the element close to the diagonal from the upper left to the lower left corner of the map and becomes large as the element goes away from the diagonal, for the background image. This means that two blocks at close positions on the image are represented dark as they have similar pixel distributions, while two blocks away from each other are represented bright, as they have more different pixel distributions.

In FIG. 10, repetitive patterns occur in the longitudinal and lateral directions in FIG. 10, because original blocks arranged in lengthwise and widthwise two dimensions (N×M) are rearranged into one dimensional structure of $X_1 \ldots X_{M,N}$, as shown in FIG. 4.

On the other hand, in FIG. 9 representing the distance map for human images, though tendencies similar to that of the background shown in FIG. 10 is recognized, there are differences especially in the middle part, which corresponds to the region of the human figure.

When all the elements of the distance map are used for the recognizing process which will be described later, the number of dimensions would be enormous, that is, tens of thousands, and hence the use of all elements can cause serious problems in both learning and recognition. To avoid such problems, the number of dimensions is reduced by the process of steps SP3 to SP9 shown in FIG. 2. More specifically, in step SP3, distance maps are compared element by element, and difference therebetween is calculated in accordance with the equation (9).

$$\omega_{(i,j)} = \frac{(\bar{d}_{obj(i,j)} - \bar{d}_{bck(i,j)})^2}{\sigma^2_{obj(i,j)} + \sigma^2_{bck(i,j)}} \quad (9)$$

Figure 11:
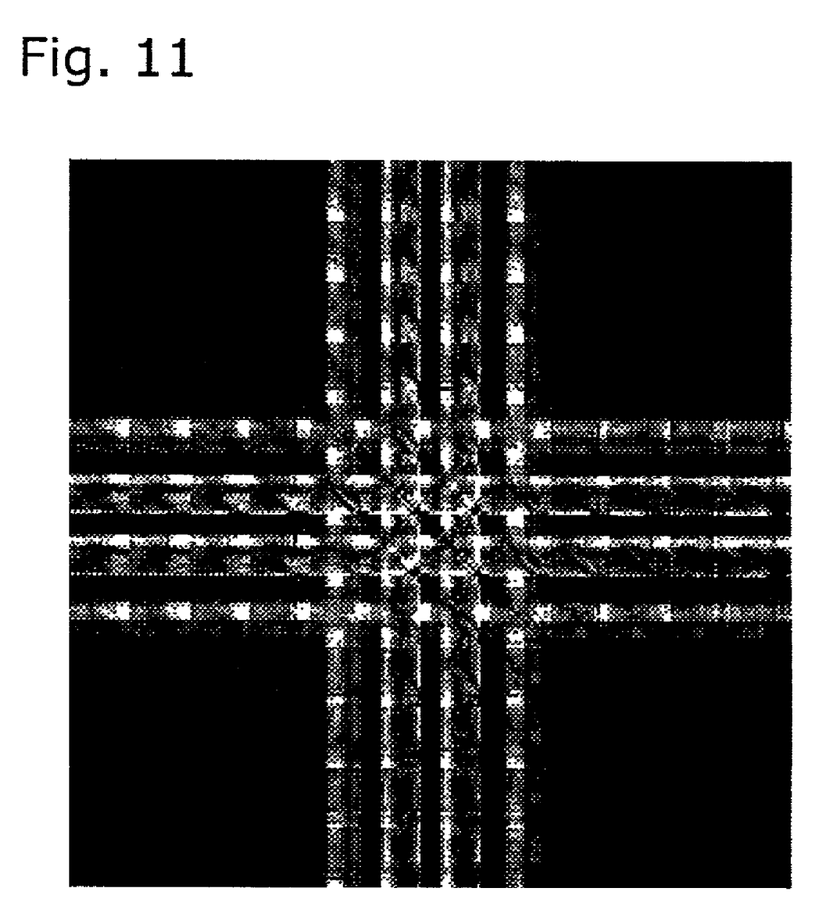
FIG. 11 represents difference between average distance maps.

FIG. 11 shows the result of comparison in accordance with the equation (9), in which a bright portion represents an element which has a large difference on the distance maps of human image and the background image, and hence it is effective in discriminating the human figure from the background. Therefore, r elements of larger values ($u_{r,1}$, $v_{r,1}$), ($u_{r,2}$, $v_{r,2}$), . . . , ($u_{r,r}$, $v_{r,r}$), are selected. For example, 2000 elements, that is, about 7.5% of all elements, are selected.

Thereafter, in step SP4, the set of r elements selected from the distance map $D_k$ is expressed as an r-dimensional distance value vector $D'_{r,k}=[dk\ (u_{r,1}, u_{v,1}), \ldots dk\ (u_{r,r}, j_{r,r})]'$.

Thereafter, in step SP5, CPU22 expresses the distance vector $D'^{obj}_{r,1}, \ldots D'^{obj}_{r,K}$ for the human image and the distance vector $D'^{bck}_{r,1}, \ldots, D'^{bck}_{r,K}$ for the background image in r-dimensional normal distribution, and in step SP6, calculates a discrimination axis for discriminating these two in accordance with linear discriminant method.

When we represent the average and covariance matrix of respective distance value vectors as $D'^{obj}_r, \Sigma_{D'obj}$ (human image) and $D'^{bck}_{r,1}, \Sigma_{D'bck}$ (background image), the discrimination axis Ar of r-dimension is expressed by the following equation (10).

$$A_r=(\Sigma_{\bar{D}_r'^{obj}}+\Sigma_{\bar{D}_r'^{bck}})^{-1}(\bar{D}_r'^{obj}-\bar{D}_r'^{bck}) \quad (10)$$

In step SP7, CPU22 excludes lower contribution elements from the discrimination axis obtained in this manner, repeats calculation of the discrimination axis in step SP8, and the number of dimensions is reduced gradually in step SP9.

Figure 12:
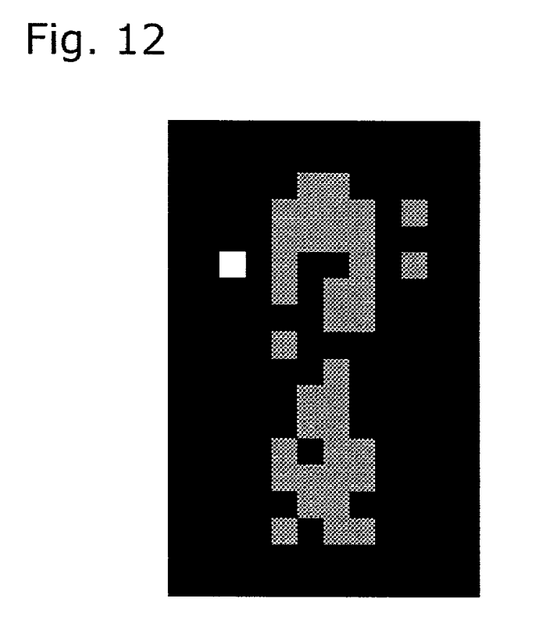
FIG. 12 shows an example which is near the center, among the selected elements.
Figure 13:
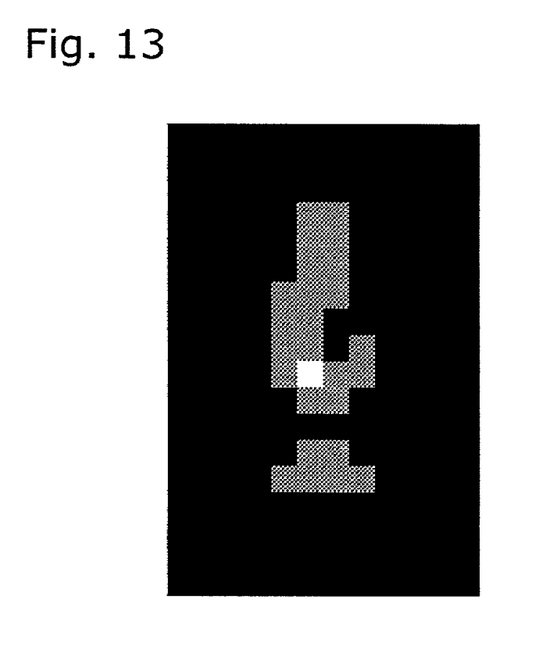
FIG. 13 shows an example which is at a distance, among the selected elements.

FIGS. 12 and 13 represent selected elements.

FIGS. 12 and 13 show an example of 50 elements (50 dimensional) displayed projected in the original image space, and one set is highlighted. Each element corresponds to 2 blocks of the original image space, which are displayed separated as ones closer to the center shown in FIG. 12 and away from the center shown in FIG. 13.

In the following, the operation of recognizing using the thus constructed model will be described. In the recognizing process, CPU 22 performs recognition based on the discrimination axis corresponding to the selected elements.

Figure 14:
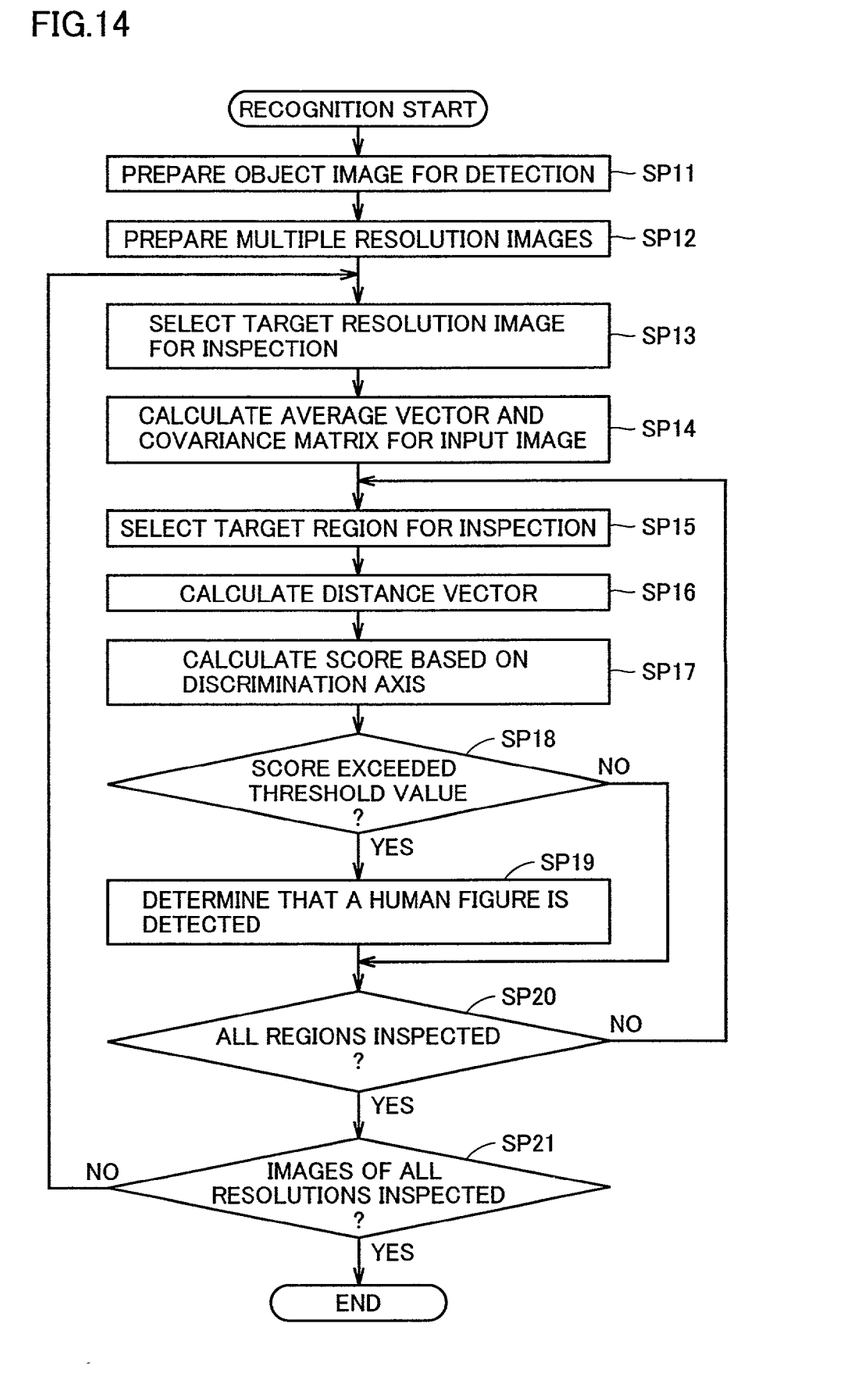
FIG. 14 is a flow chart representing the procedure of recognition by the object recognizing process in accordance with one embodiment of the present invention.
Figure 15:
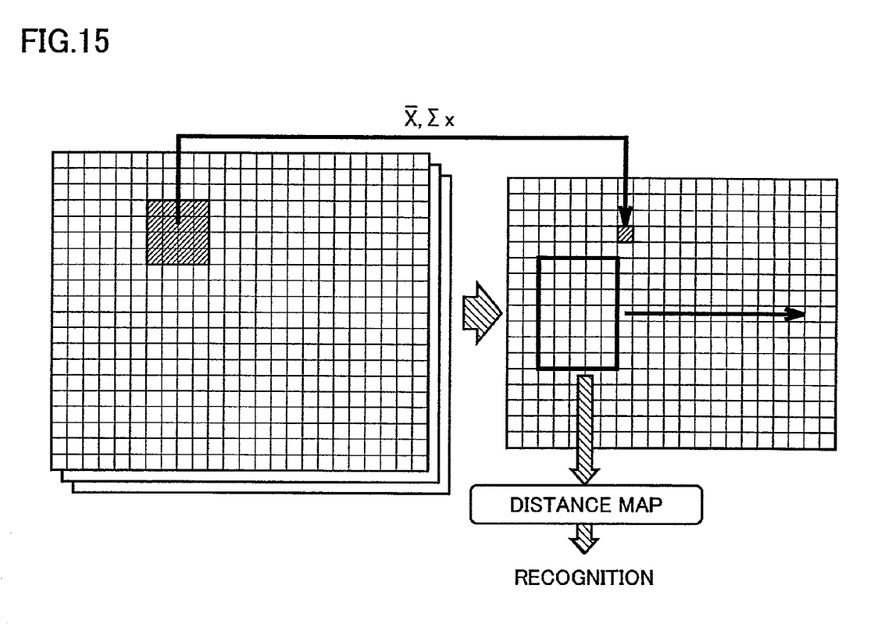
FIG. 15 shows the process of recognizing.

FIG. 14 is a flow chart representing the process of recognition of the object recognizing process in accordance with one embodiment of the present invention. FIG. 15 is a flow of the recognizing process, and FIGS. 16A to 16C represent recognizing operation using multiple resolution images.

In the recognizing process, a human figure appearing in an arbitrary size in the input image must be recognized. For this purpose, a target image for inspection is prepared in step SP11 of FIG. 14. The target image for inspection is prepared by picking up a target image by a camera, which is digitized and stored in the memory. The size of the human figure depends on the distance between the camera and the human subject, and therefore, it may be large or small.

Figure 16A:
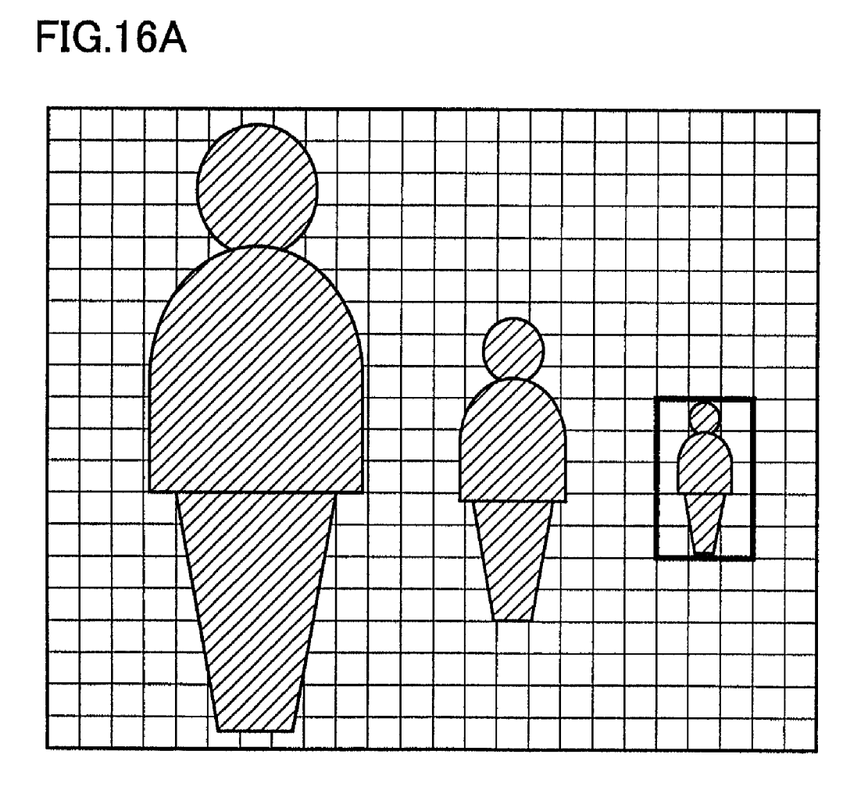
FIGS. 16A to 16C represent recognizing operation using multiple resolution images.
Figure 16B:
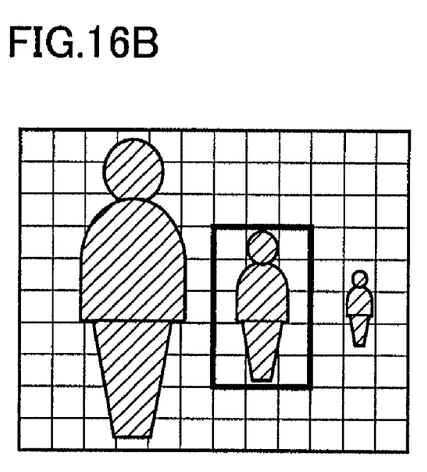
Figure 16C:
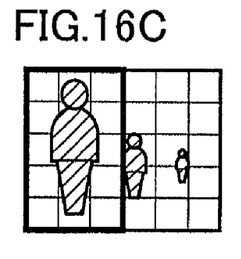

Therefore, in step SP12, images of different levels of resolutions, for example, three different resolutions are formed in advance, as shown in FIGS. 16A to 16C, based on the input image. In the example shown in FIGS. 16A to 16C, the resolution becomes rougher from 16A to 16B and further to 16C, and images of respective resolutions include three human images of different sizes. In step SP13, a target resolution image for inspection is selected from the human images of different sizes.

Assuming that the input image has 320×240 pixels as shown in FIG. 15, CPU 22 calculates average vector x and covariance matrix Σ of pixel values for every possible blocks of the input image in step SP14, in order to suppress calculation cost. Equations (2) and (3) above are used for the calculation. Thereafter, in step SP15, CPU 22 selects the target region or detection, and in step SP16, calculates distance vector $D'_r$ for each portion in the image. In step SP17, CPU22 calculates the score based on the discrimination axis Ar and distance vector $D'_r$ calculated in accordance with the equation (10), and in step SP18, determines whether the score $A_r \cdot D'_r$ exceeds a threshold value or not, in accordance with the following expression.

$$A_r D'_r > \text{threshold value} \quad (11)$$

In step SP20, CPU22 determines whether all regions have been inspected or not and when there is any region not yet inspected, the flow returns to step SP15, and steps SP15 to SP20 described above are repeated.

When all regions have been inspected, CPU22 determines in step SP21 whether all images of different resolutions have been inspected or not. When there is any image of a resolution that has not yet been inspected, the flow returns to step SP13, and the operations of steps SP13 to SP21 are repeated. Through the series of operations, when CPU 22 determines that the score exceeds the threshold value in step SP18, it is determined that a human figure is detected in step SP19.

Using the above described method, 4000 human images and 4000 background images (a total of 8000 images) were prepared for experiment. First, half of the images, that is, 4000 images (2000 human images and 2000 background images) were used for evaluating the ratio of recognition in accordance with the present invention. The experimental results are as follows.

| Number of Dimensions | 10 | 50 | 100 | 200 |
|---|---|---|---|---|
| Recognition Rate (%) | 83 | 90 | 88 | 86 |

The number of dimensions represent the number of elements of the distance map used for recognition. Here, recognition rate is the highest, that is, 90% when the number of elements is 50, and even when the number of elements is as small as 10, the recognition rate is as high as 83%.

As described above, according to the embodiment of the present invention, the object image is recognized based on the appearance characteristic of the object itself, that is, based on the difference in pixel value distributions of extracted regions, and therefore, even when the object has unspecified pixel values, correct recognition is possible. More specifically, even when pixel values of objects vary widely, such as in the case of human figures wearing different clothes, highly effective recognition is possible using a small number of models.

Further, in the embodiment of the present invention, fixed background is not assumed. Therefore, it is expected that the present invention is functional even when the camera moves, as in the case of a hand held camera or when the background or illumination changes dynamically.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An object recognizing apparatus recognizing a target object image from images, comprising:
   pixel value distribution extracting means for extracting corresponding pixel value distributions of various regions in said object image and a background image existing as a background of said object image; and
   recognizing means for recognizing said object image based on difference in pixel value distributions of various regions extracted by said pixel value distribution extracting means, wherein
   said pixel value distribution extracting means divides said background image and said object image into a number of blocks, respectively, calculates distance between pixel value distributions of different blocks to find a distance map as a set of distance values between blocks, represents an element extracted from each distance map as a distribution of distance vector of a prescribed dimension, and calculates a discrimination axis for discriminating distribution of the distance value vector of the background image and the target image, respectively.

2. The object recognizing apparatus according to claim 1, wherein
   said pixel value distribution extracting means removes lower contribution elements from said calculated discrimination axis, and calculates again the discrimination axis to reduce the number of dimensions.

3. The object recognizing apparatus according to claim 1, wherein
   said recognizing means calculates the distance value vector for each portion of an input image, and determines that said object image is detected, when a value calculated based on the calculated distance value vector and the discrimination axis obtained by said pixel value distribution extracting means is not lower than a prescribed threshold value.

4. The object recognizing apparatus according to claim 3, wherein
   said recognizing means calculates covariance matrix and average vector of pixel value for every possible block in said input image, and thereafter calculates said distance value vector with the number of dimensions reduced.

5. The object recognizing apparatus according to claim 3, wherein
   said recognizing means generates a plurality of images having different resolutions from said input image, and performs recognizing process on said images of different resolutions.

6. A method of recognizing a target object image from images, comprising
   the first step of extracting corresponding pixel value distributions of various regions in said target image and a background image existing as a background of said target image, and
   the second step of recognizing said object image based on difference in pixel value distributions of various regions extracted in said first step, wherein
   in said first step, said background image and said object image are divided into a number of blocks, respectively, distance between pixel value distributions of different blocks is calculated to find a distance map as a set of distance values between blocks, an element extracted from each distance map is represented as a distance vector distribution of a prescribed dimension, and a discrimination axis is calculated for discriminating distribution of distance value vectors of the background image and the object image, respectively.

7. The method of recognizing an object according to claim 6, wherein
in said first step, lower contribution elements are removed from said calculated discrimination axis, and the discrimination axis is calculated again to reduce the number of dimensions.

8. The method of recognizing an object according to claim 6, wherein
in said second step, a distance value vector is calculated for each portion of the input image, and it is determined that said target object image is detected when a value calculated based on the calculated distance value vector and the discrimination axis calculated by said pixel value distribution extracting means is not lower than a prescribed threshold value.

9. The method of recognizing an object according to claim 8, wherein
in said second step, a covariance matrix and an average vector of pixel values are calculated for every possible block in said input image and, thereafter, said distance value vector is calculated with the number of dimensions reduced.

10. The method of recognizing an object according to claim 8, wherein
in said second step, a plurality of images of different resolutions are generated from said input image, and recognition process is performed on said images of different resolutions.

* * * * *